United States Patent [19]

Alkofer

[11] Patent Number: 4,642,683

[45] Date of Patent: Feb. 10, 1987

[54] DIGITAL IMAGE PROCESSING METHOD FOR IMAGES WITH BIMODAL TONE VALUE DISTRIBUTION

[75] Inventor: James S. Alkofer, Hamlin, N.Y.

[73] Assignee: Eastman Kodak Company, Rochester, N.Y.

[21] Appl. No.: 730,624

[22] Filed: May 6, 1985

[51] Int. Cl.[4] .................. G03F 3/08; H04N 1/46; H04N 1/40; G03B 27/80

[52] U.S. Cl. .................. 358/80; 358/75; 358/280; 358/284; 355/38

[58] Field of Search .............. 358/75, 76, 78, 80, 358/280, 283, 284, 256; 382/18; 355/38, 35, 40, 41, 77, 88, 68

[56] References Cited

U.S. PATENT DOCUMENTS

| | | | |
|---|---|---|---|
| 3,983,320 | 9/1976 | Ketcham et al. | 358/166 |
| 4,168,120 | 9/1979 | Freier et al. | 355/38 |
| 4,403,253 | 9/1983 | Morris et al. | 358/160 |
| 4,410,909 | 10/1983 | Ueda et al. | 358/75 |
| 4,467,364 | 8/1984 | Konagaya | 358/280 |
| 4,472,736 | 9/1984 | Ushio et al. | 358/75 |

FOREIGN PATENT DOCUMENTS 297976 3/1971 U.S.S.R. .

OTHER PUBLICATIONS

"A New Approach to Programming in Photomechanical Reproduction," Yu. Ovchinnikov et al; W. Banks IPC Science and Technology Press, Guildford, England, 1974, pp. 160-163, (Twelfth International Conference of Printing Research Institutes).

"Method of Measuring Statistical Characteristics of Image," by Fainberg et al; Vsesoyuznyi nauchno-issledovatel'skii institute kompleksnykh problem poligrafii, Trudy 25(3), 13-27 (1977), (with translation).

*Primary Examiner*—James J. Groody
*Assistant Examiner*—Randall S. Svihla
*Attorney, Agent, or Firm*—Thomas H. Close

[57] ABSTRACT

In methods of digital image processing, it is a problem to automatically adjust the contrast of an image that contains a bimodal distribution of tone values, such as a back-lit scene, or some close-up flash pictures. The invention solves the problem in a digital image processing method employing a tone reproduction function generated by normalizing the histogram of a sample of tone values, by statistically testing the sample of tone values for bimodal distribution, and if the sample is determined to be bimodal, testing the statistics of the sample of tone values to determine whether the image contains useful information in the shadows, and if so, adjusting the contrast of the image by increasing the contrast of the shadow portions of the image, and decreasing the contrast of the highlight portions. A part of the sample of tone values representing the shadow portions of the image is tested for skewness, and the contrast is adjusted only if the skewness does not exceed a predetermined amount. The test for bimodality comprises testing for the satisfaction of the inequality $$0.0385\beta_1^2 + 0.9217\beta_1 + 1.7662 \geq \beta_2 \geq (\beta_1 + 1.0),$$

where $\beta_1$ and $\beta_2$ are the coefficients of skewness and peakedness of the sample of tone values respectively.

13 Claims, 10 Drawing Figures

DIGITAL IMAGE PROCESSING METHOD FOR IMAGES WITH BIMODAL TONE VALUE DISTRIBUTION

TECHNICAL FIELD

The invention relates to digital image processing and more particularly to a method for adjusting the tone scale of images having a bimodal distribution of tone values.

BACKGROUND ART

A digital image processing method has been proposed wherein a sample of tone values from the information portion of the image is normalized to produce a tone reproduction function. The tone reproduction function is then applied to the digital image to produce a processed digital image. This procedure was first proposed in the article entitled "A New Approach to Programming in Photomechanical Reproduction" by Yu. Ovchinnikov et al., the 12th IARIGAI Conference Proceedings, Versailles, France, Editor: W. Banks IPC Science and Technology Press, Guildford, England 1974, pages 160–163. Improvements to this method are disclosed in copending U.S. patent application Ser. Nos. 730,630 and 730,629, wherein the sample of tone values is selected from an image-dependent "floating" contrast interval selected as a function of the statistical characteristics of the tone value distribution in the contrast interval; and the overall contrast of the processed image is adjusted by multiplying processed tone values by a constant function of the standard deviation of tone values in the samples used to form the tone reproduction function. An extension of this method to processing digital color images to adjust tone-scale and color balance by histogram modification is disclosed in copending U.S. patent application Ser. No. 730,627.

This method produces an aesthetically pleasing processed image in most instances. However, when the tone values in the image are bimodally distributed, such as the case for back-lit photographic scenes, and some close-up flash photographic scenes, further improvement in the appearance of the processed image is desirable.

It is the object of the present invention to provide an improved digital image processing method of the type described above, wherein the appearance of processed images having a bimodal tone value distribution is further improved.

DISCLOSURE OF THE INVENTION

The object of the invention is achieved by testing the sample of tone values (e.g. photographic density) for bimodal distribution. If the sample is bimodally distributed, a statistical test is conducted to determine whether the image contains useful image detail in the shadow portions. If useful image detail is found to be present, the contrast of the processed image is increased in the shadow portions and decreased in the highlight portions.

In a preferred mode of the invention, the test for bimodality employs a function of the third and fourth standardized moments of the distribution of the tone values in the sample.

If the test for bimodality indicates that the sample is bimodal, an estimate is formed of the contrast of the shadows, including a portion or all of the highlights represented by the sample of tone values. An estimate is also formed of the contrast of only the shadows, independent of the highlights. A ratio is then formed of the estimate of the contrast of the shadow plus highlights and the contrast of the shadows alone. The value of this ratio is tested to determine whether the shadow portion of the image contains useful image detail.

According to one mode of practicing the invention, the estimate of the contrast of the shadows and highlights is formed by fitting a straight line to the tone reproduction function. The slope of the straight line fit is employed as an estimate of the spread of tone values in the image, and hence the contrast of the shadows and highlights of the image. An estimate of the contrast of the shadows alone is formed by fitting a straight line to a portion of the tone reproduction function that is chosen to avoid the region of overlap between highlights and shadows.

If the shadow portion of the image is determined to contain useful image detail, all the tone values in the image below the mean value are multiplied by a function of the ratio, and tone values above the mean are divided by the ratio function. This has the effect of increasing the contrast of the processed image in the shadow portion whenever the shadow portion contains useful image detail. The contrast of the highlight portion is correspondingly decreased, thereby enabling the entire tone scale of the processed image to fit the range of the output medium.

According to a further extension of the invention, the sample of tone values is divided in two at the median to form two new distributions approximately representing the highlight and shadow portions of the image. The skewness of the new distribution approximately representing the shadow portion of the image is tested, and the contrast of the image is adjusted only if the skewness is less than a predetermined maximum. This eliminates the possibility of making film grain more obvious in extremely underexposed originals.

According to a further refinement of the invention, a bias is also added to the tone values so that the shadow portions will not appear too dark in the processed image. The tone value bias is a function of the difference between the mean tone value of the new distribution approximately representing highlights in the image and the mean tone value of the whole sample of tone values.

BRIEF DESCRIPTION OF THE DRAWINGS

The invention will be described with reference to the drawings, wherein.

MODES OF CARRYING OUT THE INVENTION

Figure 1:
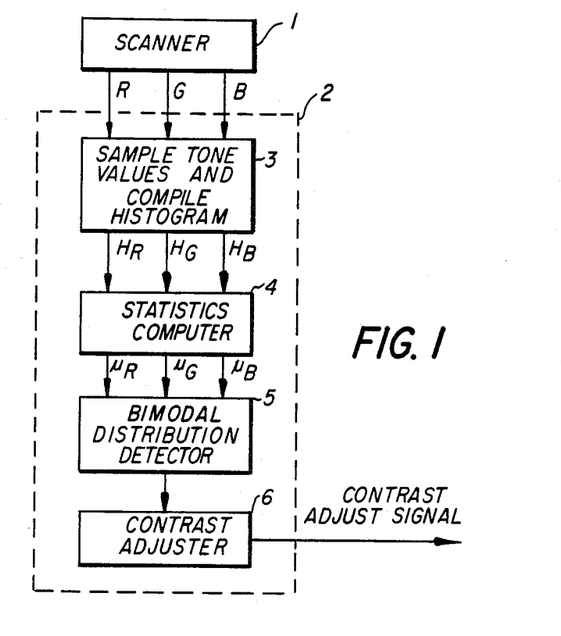
FIG. 1 is a block diagram illustrating the basic steps of testing for bimodal distribution and adjusting the contrast of the processed digital image according to the present invention.

The method of testing for bimodal distribution and adjusting the contrast of a digitally processed image according to the present invention will first be described with reference to FIG. 1. In FIG. 1, a scanner 1 scans a color film image to provide a digital color image signal having three color components R, G and B. A digital computer 2 receives the digital color image signal and is programmed as described below to provide a tone value sampler and histogram compiler 3 for sampling the color values (e.g. photographic density) from the informational portion (edges) of the digital image and compiling histograms $H_R$, $H_G$, and $H_B$ of the sampled color values in the respective colors. A statistics computer 4 receives the histogram data $H_R$, $H_G$, and $H_B$ and computes the first four standardized moments $\mu$ of the distributions comprising the histograms. A bimodal distribution detector 5 tests the statistical moments for evidence for bimodality and signals a contrast adjuster 6 if bimodality is detected. If the distribution is bimodally distributed, the contrast adjuster 6 generates signals for increasing the contrast of the shadow portion of the processed image and reducing the contrast of the highlight portion of the processed image.

Although the present invention will be described with reference to processing a color digital image signal, the method can equally well be performed on a monochrome digital image signal.

Figure 2:
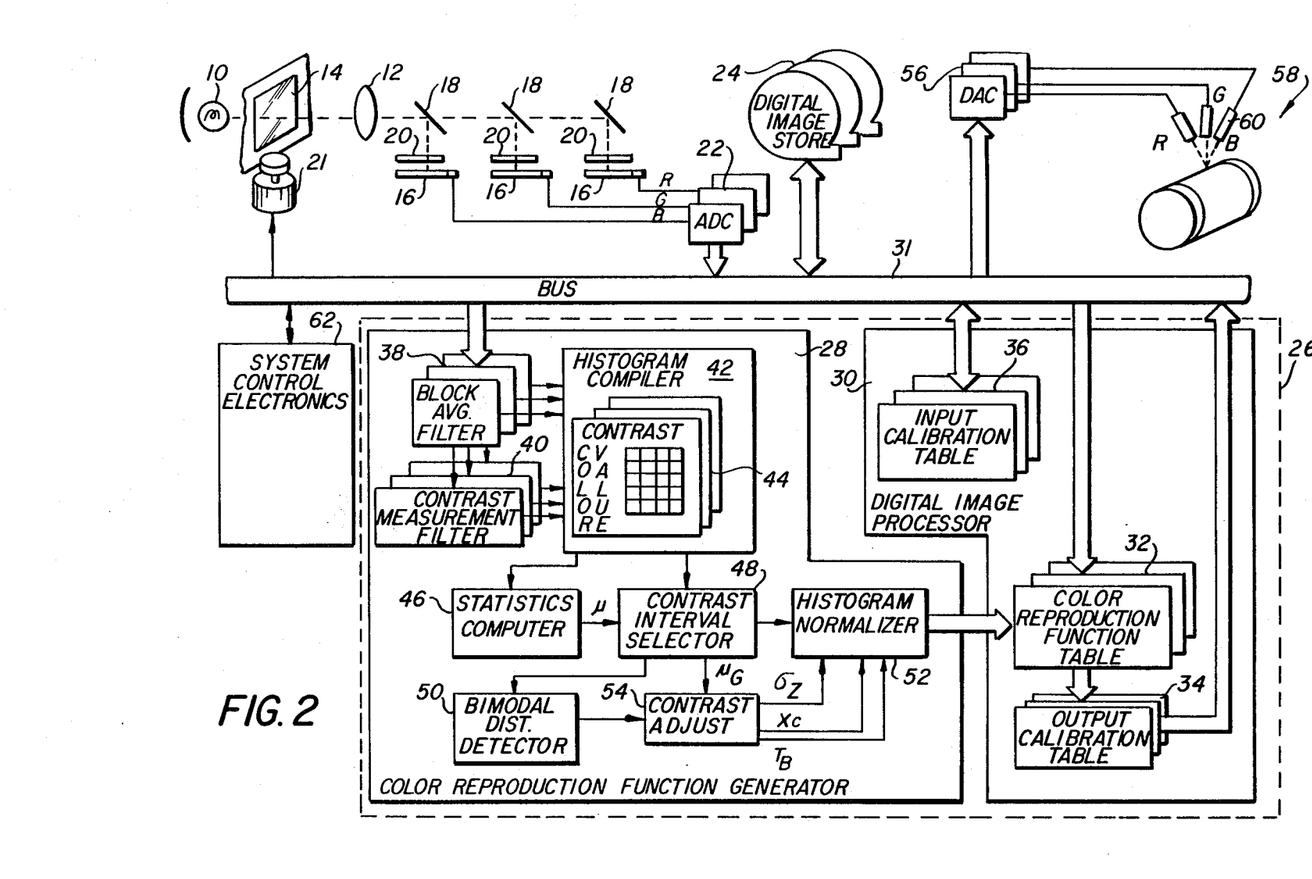
FIG. 2 is a schematic diagram illustrating apparatus for practicing a preferred mode of the present invention.

Turning now to FIG. 2, an example of a scanning printer used to practice the present invention will be described. The input device includes a light source 10 and lens 12 for projecting an image of color negative film 14 onto three solid state image sensing arrays 16, such as CCD image sensors. The image is directed to the image sensing array 16 by dichroic beam splitters 18 through color trimming filters 20, to form a red, green and blue separation image on the respective image sensors. A film advance motor 21 advances the film in the printer. The image sensors 16 scan the color photographic negatives to produce three color separation signals R, G and B. The signals thus produced are supplied to analog-to-digital converters 22 that each produce an 8-bit output code representing one of 256 possible signal levels for each sample point in the three colors.

The digital color-image signals are stored in a digital image storage memory 24, such as a magnetic tape, disc, or solid state semiconductor memory. The digital color-image signals are processed in a digital computer 26. A DEC 2060 mainframe computer was used.

The digital computer 26 is programmed to include a color reproduction function generator 28 and a digital image processor 30. The digital image processor 30 applies color reproduction functions generated by color reproduction function generator 28 to the digital color image. The color reproduction function generator 28 receives the digital color image from the digital image storage device 24 via data and control bus 31 and generates a color reproduction function table 32 for each color. The color reproduction function generator 28 also generates multiplicative constants for adjusting the contrast of the processed image as described below and supplies the constants to a histogram normalizer as described below.

Prior to storing the digital color image in digital image store 24, each input signal level is converted to an input color value, such as a photographic density, by a known scanner calibration function. The calibration function for each color is implemented in the form of a look up table 36 in the digital image processor 30, to convert each 8-bit input value to an 8-bit value representing the color negative density at the scanning point.

The color reproduction function generator 28 includes digital filters 38 for performing a block average of the color values of the digital color image. Digital filters 40 measure the contrast of the image around each block averaged color value sample in each of the three colors. A histogram compiler 42 compiles the block averaged color values from a plurality of contrast intervals in each color, in a plurality of histogram memories 44.

Figure 3:
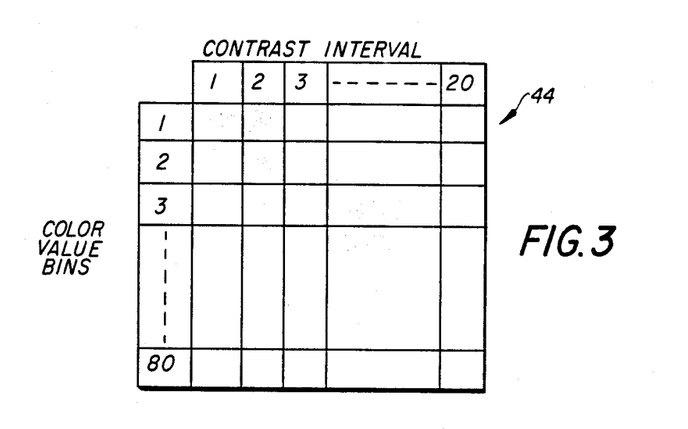
FIG. 3 is a schematic diagram showing the organization of the histogram memories used to compile the color value histograms in the apparatus of FIG. 2.

FIG. 3 shows, in a graphic way, the organization of one of the histogram memories 44 for one of the colors. There are twenty contrast intervals having a width of 0.04 log contrast units each. The width of the contrast intervals was chosen to be approximately twice the minimum visual log contrast threshold. The 256 color values are divided into 80 color value (density) bins, for a resolution of 0.05 density units per bin. Counts are accumulated in the appropriate color value bins in the histogram memories until all of the color values from the digital color image are counted.

Returning to FIG. 2, a statistics computer 46 computes the first four standardized statistical moments $\mu$ of the distributions of color values in the histogram memories 44 as described below.

A contrast interval selector 48 receives the statistical moments $\mu$ and selects a contrast interval on the basis of the statistics of the distributions of color values in the contrast intervals. A bimodal distribution detector 50 receives the statistical moments of the selected contrast interval from the contrast interval selector 48 and performs a statistical check to determine if the color value samples in the three color distributions are bimodally distributed. The bimodal distribution detector 50 generates a signal if all the distributions are bimodal. The contrast interval selector 48 supplies the selected histograms to histogram normalizer 52. Histogram normalizer 52 normalizes the histograms from the selected contrast interval to generate the color reproduction function lookup tables 32 for the digital image processor 30.

A contrast adjustment computer 54 receives the signal from the bimodal distribution detector 50 and the statistics $\mu_G$ of the green distribution from the contrast interval selector 48 and produces a multiplicative constant $\sigma_z$ used to determine the contrast of the processed image. The multiplicative constant is provided to the histogram normalizer 52 for modifying the values of the color reproduction functions. Alternatively, the multiplicative constant can be incorporated in the output calibration tables 34. If all three of the samples in the selected contrast interval are bimodal, the contrast adjustment computer performs a test to determine whether there is useful image detail in the shadows of the image; if so, the contrast adjustment computer calculates further contrast adjustments to increase the contrast of the shadow portion of the processed image and reduce the contrast of the highlight portion of the processed image. The contrast adjustment computer 54 also calculates a bias that is applied to the processed image to insure that the shadows are not too dark.

The color reproduction function lookup tables 32 relate each of the 256 possible input values in the respective colors to one of the 256 possible output values. After the color reproduction function lookup tables have been generated, the digital image processor 30 processes the digital image by applying the color reproduction functions to the respective color components of the digital color image. The output calibration functions are then applied to the respective color components of the processed digital color image. The processed digital color image is converted to analog form by digital-to-analog converters 56. The processed analog color signal is then applied to an output scanning device 58 to reproduce the image. The output device 58 is a drum-type scanner having red, green and blue laser light sources 60 that are modulated by the respective analog color signals to expose a light sensitive medium such as color photographic paper. System control electronics 62 controls and coordinates the operation of input and output scanning devices and the digital image processing computer 26.

The method of detecting bimodal distributions and generating the color reproduction function and contrast adjustments will now be described in more detail with reference to the flow charts of FIGS. 4–8.

Figure 4:
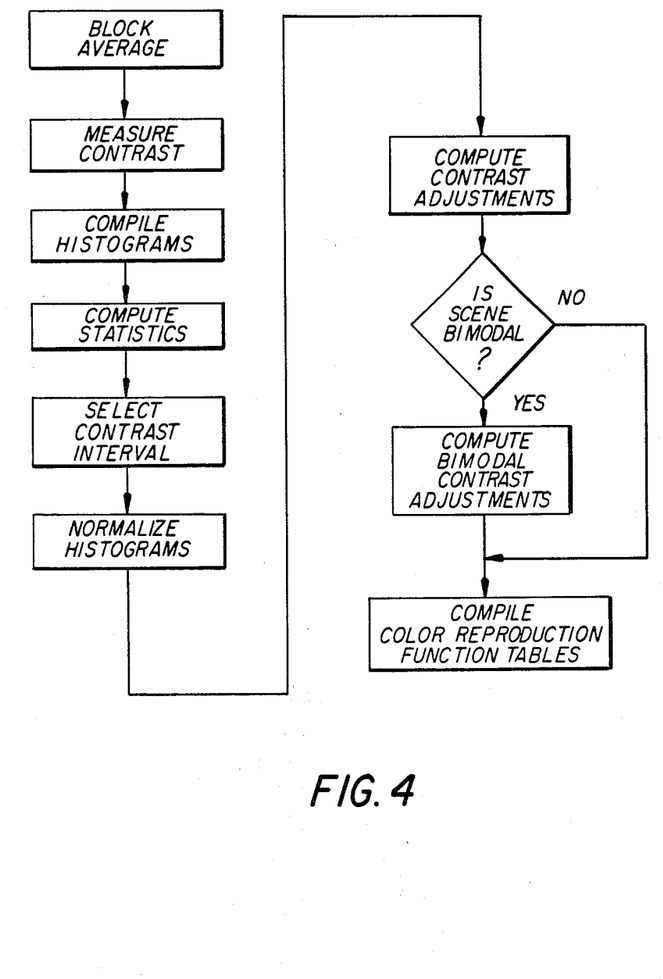
FIGS. 4–7 are flow charts illustrating the operation of the apparatus in FIG. 2 in carrying out the method of digital image processing according to the present invention.

Referring first to the flow chart of FIG. 4, the processing steps performed on the color digital image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} / 16. \tag{1}$$

This averaging is performed by the block average filters 38, shown in FIG. 2, to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \tag{2}$$

is applied to the block averaged color values of the digital color image to measure the contrast of the image at each block averaged sample point. This operation is performed by the contrast measurement filter 40 in FIG. 2. The Laplacian operator has the property of exhibiting no response to uniform areas or linear gradients, and exhibits a response only to changes in gradients. The Laplacian operator works well in measuring the contrast of the color components of the image. However, it is to be understood that other contrast measuring filters may be employed.

The respective histograms in each contrast interval for each color components are compiled as discussed above, and their statistics are computed. A contrast interval is selected on the basis of the statistical parameters of the color value distributions in the contrast interval, and the histograms of color values in the selected contrast interval are normalized to generate the respective color reproduction functions for each color. An overall contrast adjustment parameter $\sigma_z$ is calculated as a function of the standard deviation of the green color values in the selected contrast interval.

The red, green and blue distributions from the selected contrast interval are tested for bimodality. If a bimodal distribution is detected, further contrast adjustments are calculated as described below.

Figure 5:
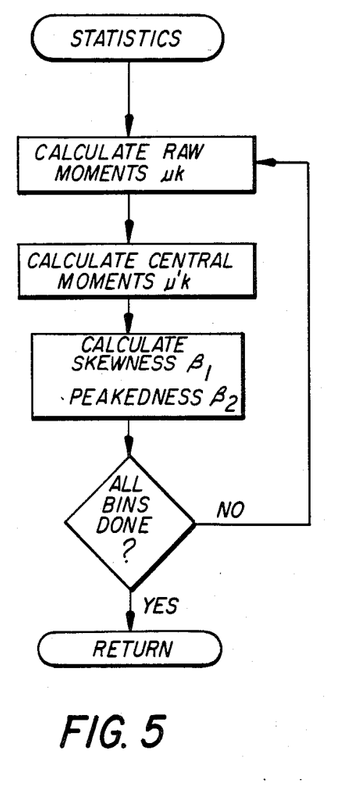

FIG. 5 is a flow chart showing the steps involved in compiling the histogram statistics for each contrast interval value. The raw moments $\mu_k$ taken about the mean, are computed as follows:

$$\mu_k = \frac{1}{N} \left( \sum_{i=1}^{N} (x_i - \bar{x})^k \right) \tag{3}$$

where

N is total number of samples in the contrast interval;

$x_i$ is a color value; and $\bar{x}$ is the mean color value.

The standardized central moments $\mu'_k$ are calculated as follows:

$$\mu'_k = \frac{\mu_k}{\sigma^k}, \text{ where } \sigma = \sqrt{\mu_2} \tag{4}$$

The coefficient of symmetry (coefficient of skewness) for each distribution is then represented as $$\beta_1 = (\mu'_3)^2 \tag{5}$$

and the coefficient of peakedness (kurtosis plus 3) is represented as $$\beta_2 = \mu'_4 \tag{6}$$

Figure 6:
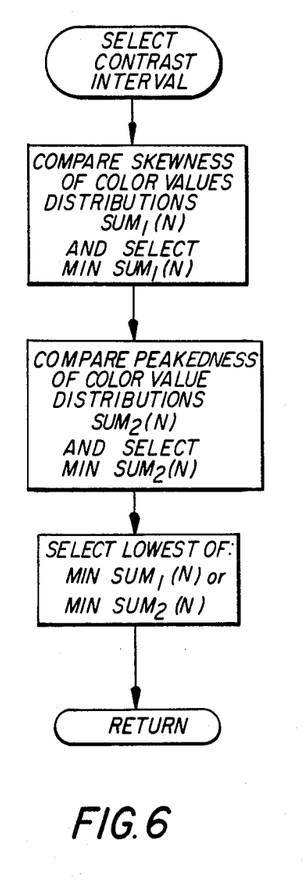

Referring to FIG. 6, the contrast interval selection criteria involves, for example, the similarity of shape of the three color value distributions in the contrast interval. The selection criteria compares the skewness of the color value distributions in each of the contrast intervals as follows:

$$\text{SUM}_1(N) = |\beta_{1R} - \beta_{1G}| + |\beta_{1B} - \beta_{1G}| + |\beta_{1R} - \beta_{1B}| \tag{7}$$

where SUM$_1$ (N) is a measure of the difference in skewness between the three color value distributions in the Nth contrast interval. The contrast interval having the most similar distribution, i.e. the lowest value of SUM$_1$ (N) is identified.

Next, the peakedness of the three color value distributions in each contrast interval is compared as follows:

$$\text{SUM}_2(N) = |\beta_{2R} - \beta_{2G}| + |\beta_{2B} - \beta_{2G}| + |\beta_{2R} - \beta_{2B}| \tag{8}$$

where SUM$_2$ (N) is a measure of difference in peakedness between the three color value distributions in the Nth contrast interval. The contrast interval having the most similar distributions, i.e. the lowest value of SUM$_2$ (N) is identified.

Finally, the lowest contrast interval (i.e. the interval representing the lowest contrast) between the two identified contrast intervals is selected.

Figure 7:
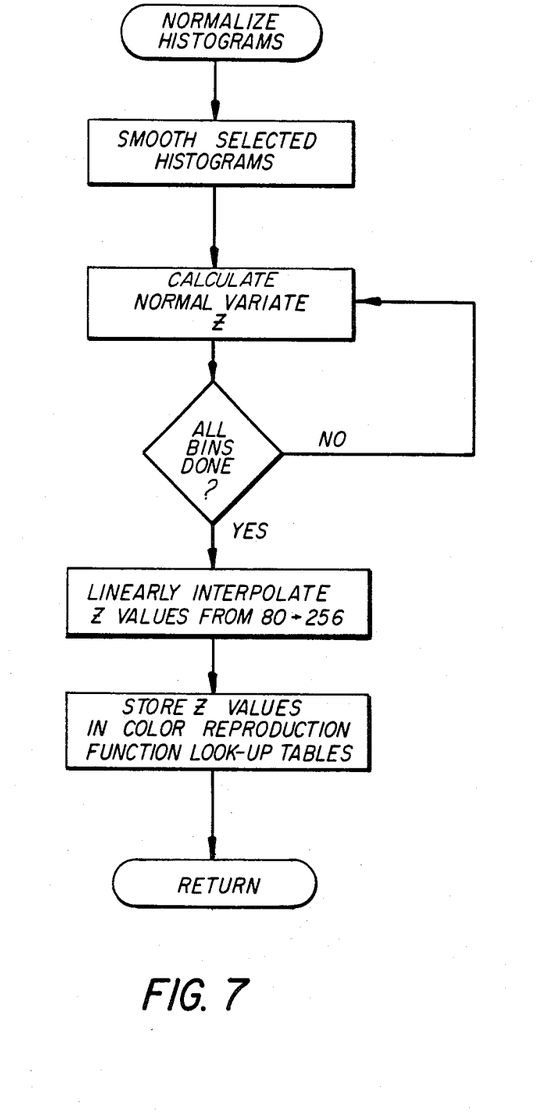

Turning now to FIG. 7, the steps involved in normalizing the color value histograms in the selected contrast interval to generate the color reproduction functions will be described. To normalize a histogram, the normal variate Z for all 80 color value bins in the contrast interval is computed. First, however, an average smoothing operation is performed on the selected color value distribution to remove any spikes. The smoothing is performed on the counts in 3 consecutive color value bins as follows:

$$h_i = \tfrac{1}{3}(h'_{i-1} + h'_i + h'_{i+1}) \qquad (9)$$

where $h'_i$ is the count in bin i and
$h_i$ is the smoothed value.

Next, the normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \qquad (10)$$

where $$t_j = \sqrt{\ln(1/P_j^2)}$$

$a_0 = 2.30753 \qquad b_1 = .99229$
$a_1 = 0.27061 \qquad b_2 = .04481$

The probability $P_j$ for each of the 80 bins is given by $$P_j = \frac{\sum_{i=1}^{j} h_i}{\sum_{i=1}^{80} h_i} \qquad (11)$$

where $h_i$ are the smoothed counts in the ith color value bin, and
j = 1 to 80.

Next, the Z values are linearly interpolated from 80 to 256 values to provide a Z value for each of the 256 possible scanner input levels represented by the 8-bit digital code. Finally the 256 Z values are stored in the color reproduction function lookup table 32. This process is applied to each of the three samples of color values in the selected contrast interval.

Figure 8:
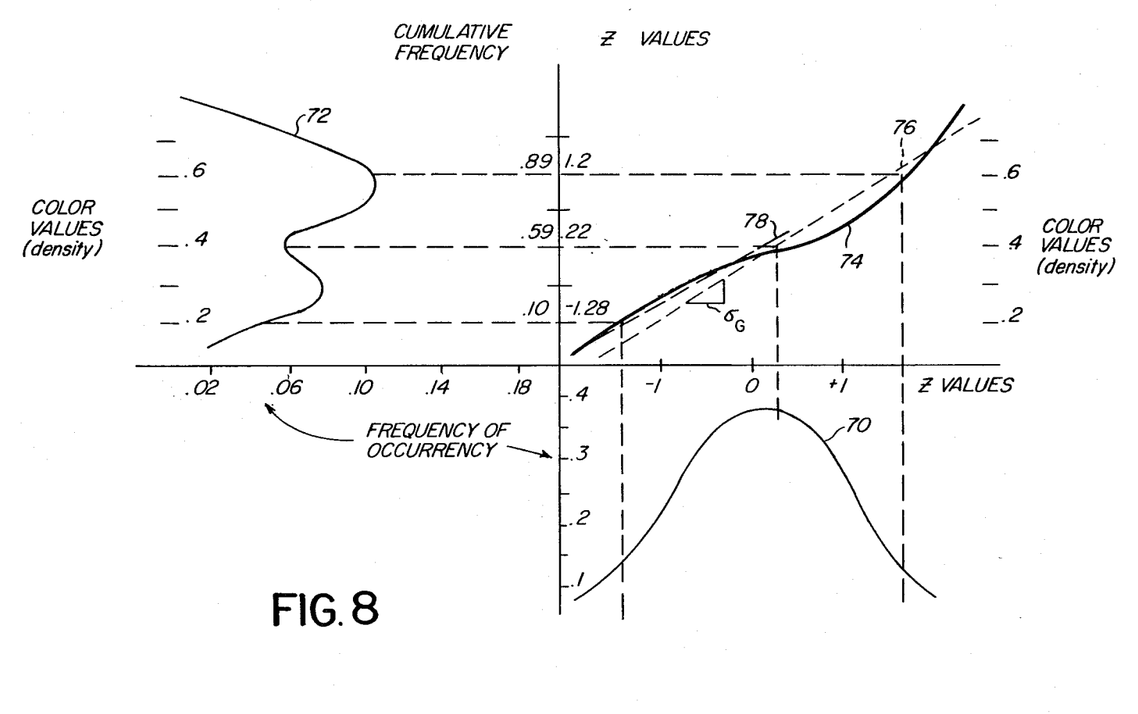
FIG. 8 is a graph illustrating the form of a color reproduction function employed by the apparatus of FIG. 2.

FIG. 8 is a graph showing the form of the color reproduction functions produced by normalizing the samples of color values in a bimodal distribution. In the lower right quadrant of the graph, a curve labeled 70 represents a standard normal distribution showing the probability of the occurrence of a value plotted against the normal variate Z. In the upper left quadrant of the graph, the curve labeled 72 represents the bimodal sample of color values from the images, plotted against relative probability of occurrence. The central ordinate of the graph relates the relative probability $P_j$ of the color value distribution to Z values according to the relationship defined by equation 10. The color reproduction curve, labeled 74, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color values from the image are dimensionless quantities representing the Z values.

To recover the processed image, these dimensionless quantities are given magnitude with respect to the original image and the output medium by multiplying the Z values with a multiplier $\sigma_z$ that adjusts the overall contrast of the processed image. To adjust the color balance of the image, a constant term is added to each of the three color values. The additive constant term relates the Z values in each color to the mean density of the output medium for the respective color, thereby causing equal Z values in all three colors to be reproduced as a shade of gray.

Appropriate values for the multiplier $\sigma_z$ that adjusts the overall contrast and the additive constants that determine the color balance of the processed image are determined as follows. The multiplier is computer based on the statistics of the green color values alone, but is applied to all three colors.

The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R \qquad (12)$$

where:

$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density Typical values for $\sigma_R$ and $\overline{G}$ for color negative photographic film are 0.31 and 0.68 respectively, such that $\sigma_D$ is 0.21. Departures from this average contrast can be compensated to improve the aesthetic appearance of the processed image. A general equation may be stated as:

$$\sigma_z = m \cdot f(\sigma_s) + b \qquad (13)$$

where:

$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the color reproduction function.

A simple and satisfactory implementation is obtained from:

$$b = \sigma_D \cdot (1.0 - m) \qquad (14)$$

$$\sigma_z = m \cdot \sigma_s + b \qquad (15)$$

where:

m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast-adjusted values of the respective colors. The complete calculation is given by:

$$\log E_{ZD} = -\sigma_z Z_D + \log E_A \quad (16)$$

where:
log $E_A$ = log exposure required to obtain the aim paper density
$Z_D$ = translated Z value for some input density in the original image
log $E_{ZD}$ = log exposure for $Z_D$.

Figure 9:
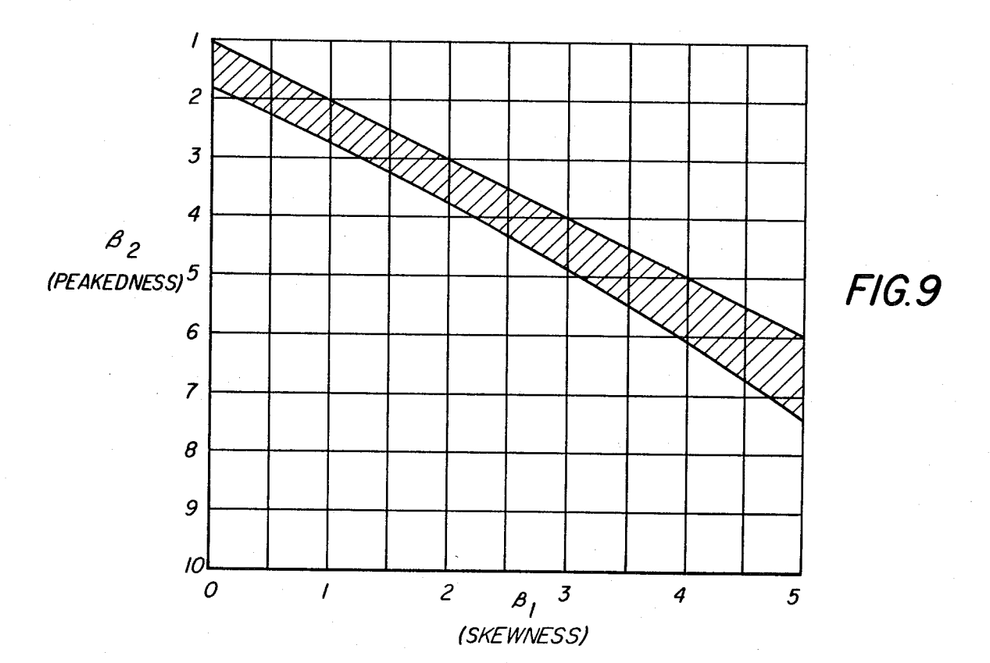
FIG. 9 is a graph illustrating the area of bimodality in statistical space.

The steps involved in calculating the contrast adjustments will now be described. First an overall contrast adjustment $\sigma_z$ is calculated as explained above. Next the coefficients of skewness $\beta_1$ (skewness squared) and the coefficients of kurtosis (peakedness) $\beta_2$ (kurtosis plus 3.0) of the red, green and blue distributions are tested for bimodality. The region of bimodality in $\beta_1$, $\beta_2$ space is shown as the crosshatched region in FIG. 9. This region is defined by the inequality:

$$0.0385 \beta_1^2 + 0.9217 \beta_1 + 1.7662 \geq \beta_2 \geq (\beta_1 + 1.0)$$

$$\text{where } \beta_1 = \frac{\mu_3^2}{\sigma^3} \text{ and } \beta_2 = \frac{\mu_4}{\sigma^4}.$$

Figure 10:
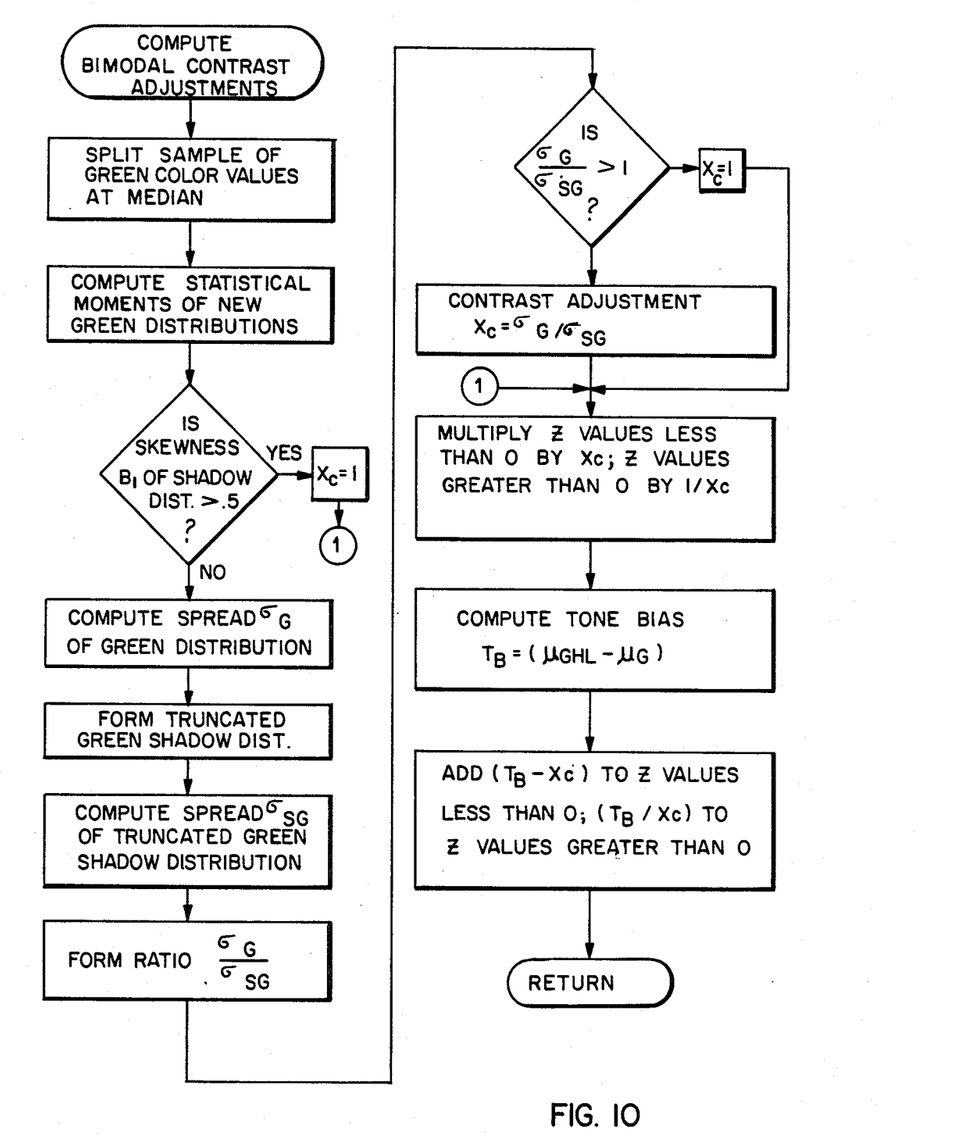
FIG. 10 is a flow chart further illustrating the operation of the apparatus according to the present invention.

If any one of the color value samples in the selected contrast interval is not bimodal, no additional contrast adjustment is desirable. If all three of the samples are bimodal, a multiplier representing additional contrast adjustment, and a tone bias is generated as shown in FIG. 10. First the green distribution is split into two at the median value to make two new distributions approximately representing highlight and the shadow portions of the image. The statistical moments of the two new distributions are calculated, and the skewness of the new distribution approximately representing the shadows is tested to see if it exceeds some system dependent value (typically 0.5). Test conducted by the inventor have shown that if the skewness of the shadow distribution is greater than 0.5, further contrast adjustment will not improve the appearance of the image and the contrast adjustment factor $X_c$ is set equal to 1.

If the skewness of the new distribution representing the shadow portion of the image is less than 0.5, the contrast adjustment factor $X_c$ is calculated as follows.

An estimate is formed of the spread (and hence the contrast) of the color values in the green distribution in the shadows and a portion or all of the highlights. One way of forming such an estimate is to use the standard deviation of the green distribution, or alternatively, the standard deviation of the portion of the green distribution below the median value. However, since the standard deviation (as normally computed) becomes a less accurate estimate of the spread of a distribution as the distribution departs from a normal distribution, a presently preferred method for estimating the spread of the distribution is to fit, by linear regression, a straight line to the green color reproduction function as shown by the dashed line labeled 76 in FIG. 8. The slope of this line $\sigma_G$ is then employed as the preferred estimation of the spread of the green color value distribution in the shadows and highlights. Alternatively, a straight line may be fit to the portion of the color reproduction function below Z=O on the abscissa in FIG. 8, as shown by the dashed line 78. The slope of this line also provides a reasonable estimate of the spread of the sample of green color values. Both approaches have been tried and have been found to work. An estimate of the spread of the color values $\sigma_{SG}$ in the shadow portion of the green color value distribution alone is made by forming a truncated green shadow distribution by selecting color values from the shadow portion of the green color value sample while avoiding color values in the region of overlap between shadows and highlights. In the presently preferred method, green color values having Z values between −2.0 and −0.5 are selected, and the standard deviation of these color values (or the slope of a straight line fit to this portion of the color reproduction function) is employed as an estimate of the spread of the distribution. A ratio $$(\sigma_G/\sigma_{SG})$$

is formed of the estimate of the spread $\sigma_G$ of the shadows and some or all of the highlights of the green distribution and the spread $\sigma_{SG}$ of the shadow distribution. The ratio of $\sigma_G$ to $\sigma_{SG}$ is tested against a system dependent constant to determine if an alteration of contrast is desirable.

In the preferred mode of practicing the invention, the system constant is one. If the ratio is less than one, no further adjustment is made. If the ratio is greater than one, all of the Z values below Z=0 in the three color reproduction functions are multiplied by a function of the ratio (for example, the function may be the ratio itself or some fraction thereof) and the Z values above zero are multiplied by the reciprocal of the function of the ratio. These multiplications are in addition to prior multiplication by $\sigma_z$. This procedure increases the contrast of the shadow portion of the image, thereby improving the appearance of the shadow portion. The procedure correspondingly reduces the contrast of the highlight portion of the image so that the entire tone scale of the image will fit within the available range of the output medium.

An overall tone bias $T_B$ is also added to the image so that the shadows will not be reproduced too dark. The overall bias is a function of the difference between the mean color value, i.e. photographic density $\mu_{GHL}$ of the new green distribution approximately representing the highlight portions of the image, obtained by splitting the sample of green color values in two at the median and the mean density $\mu_G$ of the green distribution, specified in terms of the number of standard deviations as determined from the green color reproduction function. This difference is then scaled by multiplying it by the ratio generated above and added to the Z values of the color reproduction function that are less than 0 (i.e. the Z values less than the median). The difference is divided by the ratio and added to the Z values of the color reproduction function that are greater than 0 (i.e. the Z values greater than the median).

Although the invention has been described as a method of processing digital color images, it can also be applied to the tone values of a monochrome image by testing the sample of tone values of the monochrome image for bimodality and adjusting the contrast of the processed image by increasing the contrast of the shadow portions of the image and decreasing the contrast of the highlight portions. The overall tone scale of the processed image is adjusted by adding a bias to the processed tone values as a function of the mean value of the highlight portion of the image and the mean value of the total tone value distribution.

Industrial Applicability and Advantages

The method of processing digital images having a bimodal distribution according to the present invention is useful in the graphic arts and photographic printing fields to automatically detect and adjust for images having a bimodal distribution of tone values such as backlit images and some scenes exposed with a closeup flash. The method is advantageous in that a greater percentage of high quality images are produced automatically, without the need for operator intervention, than by the methods of the prior art.

I claim:

1. A digital image processing method for processing a digital image having shadow portions and highlight portions, said method employing a tone reproduction function generated by normalizing a sample of tone values from the digital image, said tone reproduction function being applied to tone values of said digital image to produce processed tone values, characterized by the steps of:

testing said sample of tone values for bimodal distribution; if the sample is bimodal, testing said sample of tone values to determine whether the image contains useful information in the shadow portions, and if useful information is contained in the shadow portions, adjusting the contrast of the image by increasing the contrast of the shadow portions of the image and decreasing the contrast of the highlight portions of the image.

2. The digital image processing method claimed in claim 1, further characterized by the steps of:

dividing the sample of tone values in two at the median tone value of the sample to form two new tone value distributions representing the highlight and shadow portions of the digital image;

calculating the mean tone value of the sample of tone values and the mean tone value of the new distribution of tone values representing the highlight portions of the digital image;

adding a bias to the processed tone values, said bias being proportional to the difference between the mean tone value of the new distribution of tone values representing the highlight portions of the image and the mean tone value of the sample of tone values.

3. The digital image processing method claimed in claim 1, further characterized by the steps of:

dividing the sample of tone values in two at the median tone value of the sample to form two new tone value distributions representing the highlight and shadow portions of the digital image;

testing the new tone value distribution representing the shadow portions of the image for skewness, and adjusting the contrast of the image only if the skewness does not exceed a predetermined amount.

4. The digital image processing method claimed in claim 1, wherein the step of testing for bimodality comprises testing for the satisfaction of the inequality $$0.0385\beta_1^2 + 0.9217\beta_1 + 1.7662 \geq \beta_2 \geq (\beta_1 + 1.0),$$

where $\beta_1$ and $\beta_2$ are the coefficients of skewness and peakedness, respectively, of the sample of tone values.

5. The invention claimed in claim 1, wherein the tone reproduction function relates tone values of the digital image to values of a normal variate Z, and wherein the step of adjusting the contrast of the image includes the steps of:

forming a first estimate of the spread of the tone values in the shadow portions of the image and a part or all of the highlight portions of the image;

forming a second estimate of the spread of the tone values in only the shadow portions of the image;

forming a ratio of said first and second estimates;

multiplying the Z values of the tone reproduction function below $Z=0$ by the ratio; and multiplying the Z values of the tone reproduction function above $Z=0$ by the reciprocal of the ratio.

6. A digital color image processing method for correcting the tone scale and color balance of a digital color image having three color components and having shadow portions and highlight portions, comprising the steps of:

collecting a sample of color values from the informational portion of the digital color image for each of the three color components of the image;

forming a color reproduction function for each of the three color components by normalizing the respective samples of color values;

applying the color reproduction functions to color values of the respective color components of the digital color image to produce a processed digital color image; and testing the samples of color values for bimodal distribution, and if the sample for each color component is bimodal, testing one of the samples of color values to determine whether the digital color image contains useful image detail in the shadow portions, and if useful detail is contained in the shadow portions, adjusting the contrast of the digital color image by increasing the contrast of the shadow portions of the image and decreasing the contrast of the highlight portions of the image.

7. The digital color image processing method claimed in claim 6, further characterized by the steps of:

dividing one of the samples of color values in two at the median color value of the sample to form two new color value distributions representing the highlight and shadow portions of the digital color image; and testing the new color value distribution representing the shadow portions of the digital color image for skewness and adjusting the contrast of the digital color image only if the skewness is less than a predetermined amount.

8. The digital color image processing method claimed in claim 6, further comprising the steps of:

dividing one of the samples of color values in two at the median color value of the sample to form two new color value distributions representing the highlight and shadow portions of the digital color image;

calculating the mean tone value of said one sample of color values and the mean tone value of said new color value distribution representing the highlight portions of the digital color image; and adding a tone bias to the processed digital color image, said bias being proportional to the difference between the mean color value of the new color value distribution representing the highlight portions of the digital color image and the mean color value of said one sample of color values.

9. The invention claimed in claim 6, wherein the step of testing for bimodality comprises testing for the satisfaction of the inequality $$0.0385\beta_1{}^2 + 0.9217\beta_1 + 1.7662 \geqq \beta_2 \geqq (\beta_1 + 1.0),$$

where $\beta_1$ and $\beta_2$ are the coefficients of skewness and peakedness, respectively, of the samples of color values.

10. The digital color image processing method claimed in claim 6, wherein the color reproduction functions relate color values of the color components to values of a normal variate Z, and wherein the step of adjusting the contrast of the color image includes the steps of:
- forming a first estimate of the spread of the color values in one of the samples of color values in the shadow portions of the digital color image and a part or all of the highlight portions of the digital color image;
- forming a second estimate of the spread of the color values in said one sample in only the shadow portions of the digital color image;
- forming a ratio of said first and second estimates;
- multiplying the Z values of the color reproduction functions below $Z=0$ by the ratio; and
- multiplying the Z values of the color reproduction functions above $Z=0$ by the reciprocal of the ratio.

11. A digital color image processing method for correcting the tone scale and color balance of a digital color image having shadow portions and highlight portions comprising the steps of:
- (1) selecting samples of red, green and blue color values by separating red, green and blue color values of the digital color image into samples corresponding to a plurality of contrast intervals, and selecting samples of red, green and blue color values corresponding to one contrast interval based upon the similarity of the shapes of the distributions of the red, green and blue color values in the samples corresponding to the one contrast interval;
- (2) normalizing the selected samples of red, green and blue color values to produce red, green and blue color reproduction functions expressed in terms of values of a normal variate Z;
- (3) testing the selected samples of red, green and blue color values for bimodality;
- (4) if all three of the selected samples of color values are bimodal, testing statistical parameters of the sample of green color values to determine whether the digital color image contains useful information in the shadow portions, and if useful information is present, adjusting the contrast of the digital color image by:
  - a. forming a first estimate of the spread of the color values in the selected sample of green color values by fitting, by linear regression, a first straight line to the entire green color reproduction function, the slope of the first straight line being the first estimate of the spread;
  - b. forming a second estimate of the spread of the color values in the selected sample of green color values corresponding to only the shadow portions of the digital color image by fitting, by linear regression, a second straight line to the portion of the green color reproduction function corresponding to Z values between $-2.0$ and $-0.5$, the slope of the second straight line being the second estimate of the spread;
  - c. forming a ratio of the first and second estimates;
  - d. testing the ratio against a predetermined constant to determine whether the image contains useful information in the shadow portions, and if useful information is present:
    - (i) multiplying the Z values of all three color reproduction functions below $Z=0$ by the ratio;
    - (ii) multiplying the Z values of all three color reproduction functions above $Z=0$ by the reciprocal the ratio; and
    - (iii) applying said color reproduction functions to the color values of the digital color image to produce processed color values.

12. The digital color image processing method claimed in claim 11, further comprising the steps of dividing the selected sample of green color values in two at the median color value of the sample to form two new green color value distributions approximately representing the shadow portions and the highlight portions of the digital color image, and testing the skewness of the new green color value distribution representing the shadow portions of the digital color image and adjusting the contrast of the digital color image only if the skewness is less than a predetermined amount.

13. The digital color image processing method claimed in claim 12, further comprising the steps of:
- dividing the selected sample of green color values in two at the median color value of the sample to form two new green color value distributions representing the highlight and shadow portions of the digital color image;
- calculating the mean color values of the selected sample of green color values and the new green color value distribution representing the highlight portions of the digital color image; and
- adding a bias to the processed color values of the digital color image, said bias being proportional to the difference between the mean color value of the new green color value distribution representing the highlight portions of the image and the mean color value of the selected sample of green color values.

* * * * *